US008627423B2

(12) United States Patent
PalChaudhuri et al.

(10) Patent No.: US 8,627,423 B2
(45) Date of Patent: Jan. 7, 2014

(54) AUTHORIZING REMOTE ACCESS POINTS

(75) Inventors: Santashil PalChaudhuri, Mountain View, CA (US); Anupam Wadhawan, Bangalore (IN); Shekhar Kshirsagar, San Jose, CA (US); Manish Mehta, Santa Clara, CA (US)

(73) Assignee: Aruba Networks, Inc., Sunnyvale, CA (US)

( * ) Notice: Subject to any disclaimer, the term of this patent is extended or adjusted under 35 U.S.C. 154(b) by 309 days.

(21) Appl. No.: 12/757,771

(22) Filed: Apr. 9, 2010

(65) Prior Publication Data

US 2011/0252237 A1     Oct. 13, 2011

(51) Int. Cl.
    *H04L 29/06*     (2006.01)
(52) U.S. Cl.
    USPC .............................................. 726/6; 713/153
(58) Field of Classification Search
    USPC ............... 726/2, 5, 6; 713/153; 709/220–222; 717/168, 171–173, 174, 176–178
    See application file for complete search history.

(56) References Cited

U.S. PATENT DOCUMENTS

2003/0018889 A1\* 1/2003 Burnett et al. ................ 713/153
2007/0274285 A1\* 11/2007 Werber et al. ................ 370/351

OTHER PUBLICATIONS

Droms, Network Working Group Request for Comments: 2131, Obsoletes: 1541, Catagory: Standards Track "Dynamic Host Confirmation Protocol", Mar. 1997, pp. 1-45.
Housley, Network Working Group Request for Comments: 4309, Catagory: Standards Track "Using Advanced Encryption Standard (AES) CCM Mode with IPsec Encapsulating Security Payload (ESP)", Dec. 2005, pp. 1-13.
Kent et al., Network Working Group Request for Comments: 4301, Obsoletes: 2401, Catagory: Standards Track "Security Architecture for the Internet Protocol", Dec. 2005, pp. 1-101.

\* cited by examiner

*Primary Examiner* — Edward Zee
(74) *Attorney, Agent, or Firm* — Varun A. Shah

(57) ABSTRACT

Authorizing remote access points for use in a network: After the remote access point is provisioned to communicate securely to a controller using its TCP/IP address provided by a user, the remote access point is put into an un-authorized state by the controller pending further authorization. The user is presented with a secure captive portal page authenticating the end-user. User's authentication credentials are verified by the controller. After the remote access point has been authorized, the controller marks it verified as a fully functional node, and saves this state. The remote access point is provisioned with the current provisioning parameters for the remote access point as configured by the IT administrator for the end user, so that each remote access point can have unique per-user configuration applied.

18 Claims, 1 Drawing Sheet

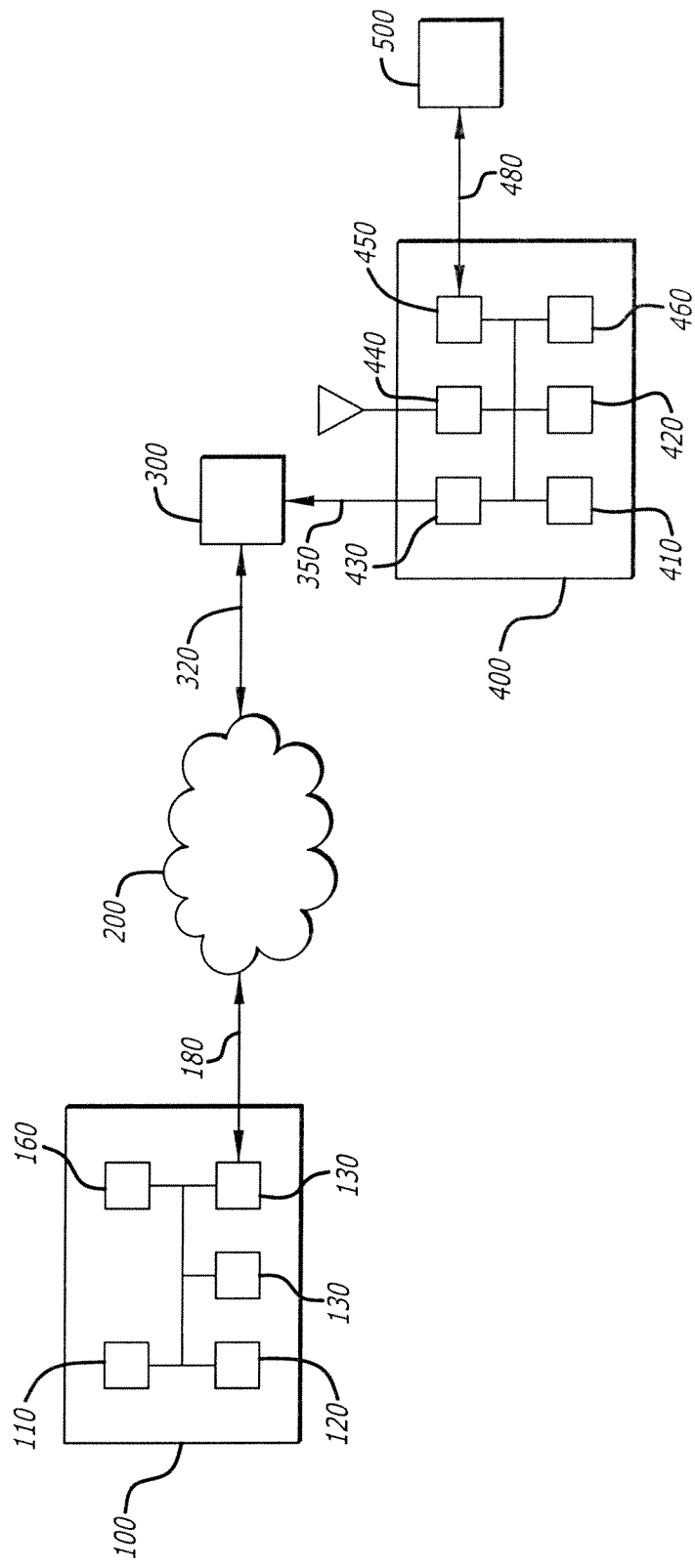

AUTHORIZING REMOTE ACCESS POINTS

CROSS REFERENCE TO RELATED APPLICATIONS

The present application is related U.S. patent application Ser. No. 12/477,774 filed Jun. 3, 2009.

BACKGROUND OF THE INVENTION

The present invention relates to telecommunication networks, and in particular, to the problem of authorizing remote access points for use in telecommunication networks.

Remote networking allows the extension of a networking environment, such as a corporate networking environment, to remote locations. In operation, a remote access point at a remote location establishes a connection with its home (corporate) controller over a network such as the switched internet. In most cases this connection is an encrypted tunnel. The remote access point, connected through a home controller, extends the services available in the corporate environment through wireless and/or wired connections with the remote access point. This allows corporate users full access to systems and services in remote locations, such as remote offices or homes. It also allows corporate information technology groups to provide such access in a controlled and secure manner.

An issue with remote access points, and in particular to deploying remote access points to a large number of users and/or locations, is the time and labor required. Each remote access point must be properly set up, or provisioned. Typically this requires an information technology specialist in the organization to take a remote access point out of its packaging, install required configuration information such as the IP address of the corporate controller the remote access point is to contact, device credentials, and any updates necessary, repackage the remote access point, and have it sent to the user. This process does not scale. A method of provisioning remote access points is described, for example, in related patent application Ser. No. 12/477,774 filed Jun. 3, 2009, and incorporated herein by reference.

What is still needed is a method to authorize the remote access point and tie that remote access point to a valid user.

BRIEF DESCRIPTION OF THE DRAWINGS

The invention may be best understood by referring to the following description and accompanying drawings that are used to illustrate embodiments of the invention in which:

FIG. 1 shows a network.

DETAILED DESCRIPTION

Embodiments of the invention relate to methods of authorizing remote access points. When an un-provisioned remote access point is powered up by a user, it establishes an internet connection using a first port. On a second port, the remote access point requests user input relating to the TCP/IP address or fully qualified domain name of the controller which is to support the remote access point. The remote access point uses this user input and access point identification such as a certificate or shared-key pre-stored in the remote access point to establish a secure connection to the controller via an internet connection using the first port, and becomes an authenticated but un-provisioned and un-authorized remote access point.

The controller checks the remote access point's provisioning parameters with the parameters that are configured for that node in a list maintained by the controller. If the provisioning parameters are different, then the controller automatically provisions the remote access point with the new provisioning parameters that the controller has for the node. The remote access point reboots with the new provisioning parameters and henceforth with every boot-up always gets configuration according to the assigned provisioning. This allows the controller to use a list to segregate different remote access points into different groups automatically and hence receive different configurations. Now the remote access point becomes a provisioned but un-authorized remote access point.

If the remote access point is in this un-authorized state, then it is only sent part of the configuration which does not provide any unauthorized access to the corporate network. This part of the configuration only contains enough information for the remote access point to support user validation, for example through a secure captive portal page. Once the identity of the user is verified using the corporate credentials or a certificate supplied by the user, then the remote access point is marked authorized. Once authorized, the remote access point is sent the complete configuration as deemed by the provisioning parameters. Now the remote access point becomes a provisioned and authorized remote access point.

FIG. 1 shows a network. Router 100 connects 180 to a switched network 200 such as the Internet. At a remote location, interface 300 also connects 320 to network 200 providing connectivity 350. Interface 300 may be a device known to the art such as a DSL or Cable modem, or a wireless interface such as a 3G, WiMAX, WiFi, or other radio connection. Interface 300 provides services such as Internet access via wired connection 350, which may be in the form of an IEEE802.3 Ethernet interface, or another wired interface such as USB or IEEE1394 Firewire. Remote access point 400 connects 350 to the Internet via first wired interface 430.

Controller 100 is a purpose-built digital device having a CPU 110, memory hierarchy 120, and a plurality of network interfaces 130. CPU 110 may be a MIPS-class processor from companies such as Raza Microelectronics or Cavium Networks, although CPUs from companies such as Intel, AMD, IBM, Freescale, or the like may also be used. Memory hierarchy 120 includes read-only memory for device startup and initialization, high-speed read-write memory such as DRAM for containing programs and data during operation, and bulk memory such as hard disk or compact flash for permanent file storage of programs and data. Network interfaces 130 are typically IEEE 802.3 Ethernet interfaces to copper, although high-speed optical fiber interfaces may also be used. Controller 100 typically operates under the control of purpose-built embedded software, typically running under a Linux operating system, or an operating system for embedded devices such as VXWorks. Controller 100 may have dedicated hardware for encryption, and/or for routing packets between network interfaces 130.

Remote access point 400 is also a purpose-built digital device having a CPU 410, memory hierarchy 420, a first wired interface 430, an optional wireless interface 440, and second wired interface 450 which may represent a plurality of additional wired interfaces. As with controller 100, the CPU commonly used for such access points is a MIPS-class CPU such as one from Raza Microelectronics or Cavium Networks, although processors from other vendors such as Intel, AMD, Freescale, and IBM may be used. Memory hierarchy 420 comprises read-only storage such as ROM or EEPROM for device startup and initialization, fast read-write storage such as DRAM for holding operating programs and data, and permanent bulk file storage such as compact flash memory.

Remote access point 400 typically operates under control of purpose-built programs running on an embedded operating system such as Linux or VXWorks. Optional wireless interface 340 is typically an interface operating to the family of IEEE 802.11 standards including but not limited to 802.11a, b, g, and/or n. First wired interface 430 may be an IEEE 803.2 Ethernet interface, or other wired interface such as USB or IEEE1394 Firewire. Similarly, second wired interface 450 may be one or more IEEE 802.3 Ethernet interfaces, USB interfaces, IEEE 1493 Firewire interfaces, or a combination. As an example, a small remote access point 400 may have an IEEE 803.2 Ethernet wired interface for first wired interface 430, an IEEE 802.11 a/b/g/n wireless interface 440, and an additional IEEE 802.3 Ethernet port and a USB port as second wired interface 450. A larger remote access point 400 may have multiple second Ethernet ports.

According to the invention, the user of remote access point 400 keeps the same setup that was used when initially provisioning the node, by establishing a connection 350 between internet interface 300 and first interface 430. A second connection 480 is established between second interface 450 and a personal computer 500. It should be noted that one or both of these connections could be wireless connections, such as IEEE 802.11 Wi-Fi connections.

But, the user interface that the user receives on his web browser in an un-provisioned state is different than what the user receives in a provisioned but un-authorized state. In the un-provisioned state, a generic provisioning web page requests the address of the controller, for example the TCP/IP or FQDN address for the controller, a key code containing the address in encoded form, or through a certificate provided to the user which contains the address of the controller. But, in the provisioned but un-authorized state, the browser web page is a customized secure captive portal page for the company the remote access point belongs too, and where the user inputs corporate authentication credentials. The corporate authentication credentials might be the user's corporate username/password or it might be a per-user certificate provided to the user to assist in authorizing the remote access point.

According to an aspect of related U.S. patent application Ser. No. 12/477,774, remote access points are allowed to authenticate to a controller by the controller maintaining a whitelist of valid remote nodes. If the node's MAC address, which is present in the device credentials such as digital certificate, is on the whitelist, the connection is accepted, otherwise the connection is rejected.

In one embodiment of the invention, a mapping is maintained between the node's MAC address and desired provisioning identifier. This mapping allows for changing of the provisioning parameters of the remote access point even while it is offline and not accessible to the controller. When the remote access point 400 connects and has different provisioning parameters than what the controller is configured with, then the controller automatically provisions this remote access point. In this fashion the controller can uniquely provision different access points to have different configuration based on this maintained mapping.

In a further embodiment of the invention, the user placing remote access point 400 in service is authorized with controller 100 prior to placing the remote access point in service. This step insures that remote access point 400 is only provisioned by authorized users, and allows the identity of the provisioning user to be associated and tracked with the remote access point. This authentication of the user by controller 100 may be through the user entering a name and password, which is verified by controller 100, challenge and response such as using a security key or other two-factor approaches, by presenting a certificate containing user credentials, biometric verification, or other means known to the art. As described above, a single certificate combining the address of controller 100 and the identity of the user may be used. This certificate may be signed, and the signature may be a cryptographic signature. Upon verification of the user's identity, controller 100 may associate the user's identity with the remote access point, and similarly, the remote access point may be associated with the user. This information may be shared, for example, with human resources information systems to track enterprise equipment assigned to the user.

With the configuration information now present, initialization is complete, and operation of the remote access point in its provisioned state may now begin. This may be accomplished by the initialization program starting the remote access point software, or by the initialization software restarting remote access point 400.

While the invention has been described in terms of various embodiments, the invention should not be limited to only those embodiments described, but can be practiced with modification and alteration within the spirit and scope of the appended claims. The description is this to be regarded as illustrative rather than limiting.

We claim:

1. A method comprising:
sending a first configuration information to an access point to configure the access point to support user verification and to operate without the access point being authorized to access to one or more resources within a network;
receiving, from the access point, user credentials associated with a user;
verifying the user credentials associated with the user;
responsive to verifying the user credentials associated with the user, sending a second configuration information to configure the access point to operate with the access point being authorized to access to the one or more resources within the network.

2. The method of claim 1, wherein prior to receiving user credentials from the access point, the user credentials are received by the access point from a client device communicatively coupled to the access point.

3. The method of claim 1, wherein prior to sending the second configuration information and after sending the first configuration information, the method further comprises: sending a third configuration information that is necessary to authorize the access point.

4. The method of claim 1, wherein the user credentials comprise a user-entered username and password.

5. The method of claim 1, wherein the first configuration is used by the access point to cause a client device, communicatively coupled to the access point, to display a captive portal page for obtaining the user credentials from a user.

6. The method of claim 1, wherein the method is performed by a controller comprising functionality to configure the access point.

7. A network device comprising:
one or more hardware processors;
the network device being configured to perform operations comprising:
sending a first configuration information to an access point to configure the access point to support user verification and to operate without the access point being authorized to access to one or more resources within a network;
receiving, from the access point, user credentials associated with a user;
verifying the user credentials associated with the user;

responsive to verifying the user credentials associated with the user, sending a second configuration information to configure the access point to operate with the access point being authorized to access to the one or more resources within the network.

8. The network device of claim 7, wherein prior to receiving user credentials from the access point, the user credentials are received by the access point from a client device communicatively coupled to the access point.

9. The network device of claim 7, wherein prior to sending the second configuration information and after sending the first configuration information, the operations further comprise: sending a third configuration information that is necessary to authorize the access point.

10. The network device of claim 7, wherein the user credentials comprise a user-entered username and password.

11. The network device of claim 7, wherein the first configuration is used by the access point to cause a client device, communicatively coupled to the access point, to display a captive portal page for obtaining the user credentials from a user.

12. The network device of claim 7, wherein the network device is a controller comprising functionality to configure the access point.

13. A non-transitory computer readable storage medium comprising instructions which, when executed by one or more hardware processors, causes performance of operations comprising:

sending a first configuration information to an access point to configure the access point to support user verification and to operate without the access point being authorized to access to one or more resources within a network;

receiving, from the access point, user credentials associated with a user;

verifying the user credentials associated with the user;

responsive to verifying the user credentials associated with the user, sending a second configuration information to configure the access point to operate with the access point being authorized to access to the one or more resources within the network.

14. The medium of claim 13, wherein prior to receiving user credentials from the access point, the user credentials are received by the access point from a client device communicatively coupled to the access point.

15. The medium of claim 13, wherein prior to sending the second configuration information and after sending the first configuration information, the operations further comprise: sending a third configuration information that is necessary to authorize the access point.

16. The medium of claim 13, wherein the user credentials comprise a user-entered username and password.

17. The medium of claim 13, wherein the first configuration is used by the access point to cause a client device, communicatively coupled to the access point, to display a captive portal page for obtaining the user credentials from a user.

18. The medium of claim 13, wherein the network device is a controller comprising functionality to configure the access point.

* * * * *